United States Patent Office 3,480,578
Patented Nov. 25, 1969

3,480,578
PREPARATION OF CARBOXYLIC POLYMERS
IN ACIDIC AQUEOUS MEDIA
Edward Witt, Dover, Del., assignor to Standard Brands Chemical Industries, Inc., Dover, Del., a corporation of Delaware
No Drawing. Filed Jan. 19, 1966, Ser. No. 536,222
Int. Cl. C08d 9/14; C08f 21/04; C08h 9/00
U.S. Cl. 260—23.7
19 Claims

ABSTRACT OF THE DISCLOSURE

A polymerization system for preparing polymeric latices containing alkaline sensitive groups which comprises an aqueous emulsion containing a carboxylic emulsifier, i.e., fatty acids, rosin acids, their partial soaps or mixtures thereof, and polymerizable monomeric material containing monomers having alkaline sensitive groups, i.e., carboxyl groups or their ester derivatives, at an acid pH, i.e. below 7.

---

This invention relates to emulsion polymerization of monomeric materials containing carboxyl and/or other alkaline sensitive groups and to the unique latices or aqueous dispersions of polymers produced by such polymerization. In particular, this invention relates to a system and process for polymerization of monomers containing carboxyl groups, their ester derivatives, and/or other alkaline sensitive groups in an aqueous emulsion containing carboxylic emulsifiers and to the resulting unique latices.

Heretofore, it has been the practice to employ carboxylic emulsifiers as emulsion stabilizers and in supporting polymerizations only at high pH levels, i.e., usually about a pH of 9 or more. Latices produced from monomers containing carboxyl groups, their ester derivatives and the like and particularly those aqueous dispersions of carboxyl-containing polymers having a substantial proportion of bound acid, i.e., pendant carboxylic acid groups within the polymer chain, are not produced by emulsion polymerization at such high pH levels. Thus, it has been generally accepted that latices prepared from unsaturated monomers containing carboxyl groups and the like had to be made in aqueous systems containing nonionic emulsifiers or with sulfonate or other anionic emulsifiers that are effective at low pH, i.e., 7 or below. Use of these emulsifiers, however, produces latices which are often difficult to coagulate in subsequent operations, or which produce deposited latex coatings, films, layers, and the like that are water sensitive. Advantageously, in accordance with this invention the above-enumerated shortcomings of the prior art are overcome in the production of unique latices from monomers containing alkaline sensitive groups.

This invention contemplates the production of unique latices by effecting polymerization of unsaturated monomers containing carboxyl groups, their ester derivatives, and/or other alkaline sensitive groups with or without other polymerizable unsaturated monomers in an aqueous emulsion system containing certain carboxylic emulsifiers and having a pH that may range from acidic to substantially neutral. Preferable the pH of the system is acidic.

The term "alkaline sensitive groups" as used herein, refers to those radicals which are unstable or are converted to other radicals under alkaline conditions. For example, carboxyl groups (COOH) are neutralized in an alkaline solution; whereas their ester derivatives, e.g., alkoxy radicals, are sensitive to hydrolysis in an alkaline solution. Thus, emulsion polymerization of monomers containing such groups in an alkaline medium will fail to produce polymers having a substantial proportion of alkaline sensitive groups pendant from the polymer chain.

It will be appreciated that some monomers containing alkaline sensitive groups may be polymerized under slightly alkaline conditions if certain polymerization aids, e.g., selected emulsifiers, surfactants and the like are present, but such polymerizations are usually more difficult to conduct than those conducted under neutral or acid conditions.

Furthermore, the term "carboxyl-containing" refers to a monomer or monomeric mixture containing at least one monomer having one or more pendant carboxylic acid groups (COOH) or acid salts thereof and the term "non-carboxylic" means the monomer is devoid of carboxylic acid groups and acid salts formed by such groups.

In particular one aspect of this invention is directed to an aqueous emulsion system for polymerization of monomers containing alkaline sensitive groups that contains carboxylic emulsifiers such as fatty acids, rosin acids, or mixtures or derivatives thereof or the like as the primary emulsifier with or without an auxiliary emulsifier and having a pH in the vicinity of 7 or lower. Another aspect of this invention is concerned with a process for producing unique latices by effecting polymerization of a monomer containing alkaline sensitive groups in an aqueous emulsion system which contains a carboxylic emulsifier at a pH in the vicinity of 7 or lower.

Yet another aspect of the invention is directed to unique latices containing alkaline sensitive groups which are readily coagulated and which produce deposited coatings, layers, films and the like that are substantially insensitive to water.

In accordance with this invention it has been found that unique carboxylic latices or aqueous dispersions of polymers having a substantial proportion of bound acid, i.e., pendant carboxylic acid groups in the polymer chain, can be prepared by effecting emulsion polymerization of a monomeric mixture containing at least one carboxyl-containing unsaturated monomer, at least one diene and/or one or more polymerizable non-carboxylic ethylenically unsaturated monomers in an acidic or nearly neutral aqueous system containing a carboxylic emulsifier. Furthermore, it has been found that the addition of small concentrations of auxiliary emulsifiers or dispersants advantageously increases the rate of polymerization of such carboxyl-containing monomeric mixtures.

The preferred latices of this invention are prepared from monomeric mixtures containing at least one carboxyl-containing unsaturated monomer, at least one aliphatic conjugated diene and, preferably, one or more non-carboxylic ethylenically unsaturated monomers copolymerizable with the diene. As used here, the term "ethylenically unsaturated monomers" includes copolymerizable monoolefinic monomers and is to be construed as excluding conjugated dienes, but may include other polyolefinic monomers. Thus it will be appreciated that the preferred latices may be prepared from one or more monomers containing alkaline sensitive groups.

The carboxyl-containing monomers that can be used to prepare the unique carboxylic latices of this invention include a variety of unsaturated monocarboxylic and polycarboxylic acids and the partial esters of the polycarboxylic acids. In general, suitable acids are characterized by possessing one or more olefinic carbon-to-carbon double bonds and one or more carboxyl groups in which at least one of the olefinic carbon-to-carbon double bonds are activated, as is understood in the polymerization art, to render the acid copolymerizable with the diene and the noncarboxylic monoolefinic monomer.

Suitable carboxyl-containing monomers are represented by the following formula:

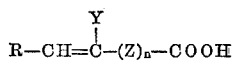

in which R is preferably hydrogen or carboxyl, but may be carboxylic ester, alkyl or alkenyl, Y is hydrogen, carboxyl, carboxylic ester, halogen, cyano, sulfo, alkyl, aryl, thienyl or furyl, Z is a methylene or a substituted methylene group, or an allyl, arylene, thienylene or furylene divalent radical, n is zero or any whole number, suitably not exceeding 3, and in which at least one of the group R and Y is carboxyl or Z is carboxyl-containing for those monomers containing more than one carboxyl group. Representative examples of the monocarboxylic acids designated by the above formula include acrylic and substituted acrylic acid and other copolymerizable ethylenically unsaturated monocarboxylic acids, such as crotonic acid, alpha-chlorocrotonic acid, hydrosorbic acid, cinnamic acid, m-chlorocinnamic acid, p-chlorocinnami acid, acrylic acid, alpha-chloroacrylic acid, methacrylic acid, ethacrylic acid, vinyl thiophenic acid, alphafuryl acrylic acid, vinyl furoic acid, p-vinylbenzoic acid, vinylnaphoic acid, alpha-isopropenyl acrylic acid, alpha-styrl acrylic acid, (2-carboxy-4-phenyl-1,3-butadiene), sorbic acid, alpha-methyl sorbic acid, alpha-ethyl sorbic acid, alpha-chloro sorbic acid, alpha-bromo sorbic acid, beta-chloro sorbic acid, alpha-, beta-, or gamma-epsilon-dimethyl sorbic acid, 2,4-heptadienoic acid, 2,4-hexadienoic acid, 2,4-pentadienoic acid, alpha- and beta-vinyl acrylic acids.

In addition, such monomers include olefinically unsaturated polycarboxylic acids such as fumaric, maleic, citraconic, mesaconic, itaconic, aconitic, ethyl maleic acid, methyl itaconic, muconic, hydromuconic, glutaconic; 2-carboxy-penta-diene-(2,4)-oic-1, beta - (p-carboxyphenyl) acrylic, 2,4-pentadiendioic-1,3-acid, the dimer and trimer of methacrylic acid and other monoolefinic and polyolefinic polycarboxylic acids, the monoolefinic acids being preferred for many applications of the unique carboxylic latices. The utilization of these copolymerizable polybasic acids or their anhydrides which are readily hydrolyzed in the acidic polymerization provides a means for direct introduction of the polycarboxylic acid groups into the polymer chain.

The partial esters of unsaturated polycarboxylic acids employed in this invention may be prepared from unsaturated carboxylic acids having two or more carboxyl groups or the anhydrides thereof. It will be understood that the expression "partial ester of an unsaturated polycarboxylic acid" refers to those compounds in which at least one carboxyl group is esterified and at least one further carboxyl group is unreacted. As noted above, examples of unsaturated polycarboxylic acids include fumaric, maleic, glutaconic, citraconic, itaconic, mesaconic, aconitic, and the like, with fumaric, maleic, and itaconic acids being particularly preferred for the purposes of preparing partial esters. Although many compounds containing hydroxyl groups may be considered as alcohol components useful to esterify at least one of the carboxyl groups in the polycarboxylic acids, the alphatic saturated and unsaturated alcohols containing from 1 to about 20 carbon atoms, and preferably from 1 to 10 carbon atoms have been found to be the most preferred.

Preferably, the partial esters employed are the "half esters" or monoesters prepared from unsaturated acids containing two carboxylic groups. These monoesters of dibasic acids have the structural formula:

wherein X represents the acid residue of a dibasic acid having from 4 to 8 carbon atoms, and preferably from 4 to 5 carbon atoms and R' represents an alkyl, aryl, alkylaryl, aralkyl, cyclo-aliphatic group, or halogen-, acyloxy-, or alkoxy-substituted derivative thereof containing from about 1 to 15 carbon atoms, and with the alkyl groups containing from 1 to 8 carbon atoms being most preferred radicals, and wherein the R' group may be substituted on either of the carboxylic groups of the acid residue.

Exemplary of the radicals represented by R' in the above formula are: methyl, ethyl, propyl, isopropyl, butyl, isobutyl, sec-butyl, t-butyl, amyl, hexyl, decyl, chloromethyl, chloroethyl, cyclohexyl, methyl-cyclopentyl, propyl-cyclopentyl, amyl-cyclopentyl, methyl-cyclohexyl, dimethyl-cyclohexyl, phenyl, chloro-phenyl, xenyl, naphthyl, tolyl, xylyl, ethyl-phenyl, propyl-phenyl, isopropyl-phenyl, benzyl, acetoxy-ethyl, chlorophenoxy-ethyl, methoxy-propyl, and the like.

The aliphatic conjugated dienes suitable for preparing carboxylic latices include the butadiene-1,3 hydrocarbons such as butadiene-1,3 itself; 2-methyl butadiene-1,3 (isoprene); 2,3-dimethyl butadiene-1,3; piperylene; 2-neopentyl butadiene-1,3; and other hydrocarbon homologs of butadiene-1,3. In addition, the substituted dienes, such as 2-chloro butadiene-1,3; 2-cyano butadiene-1,3; the straight chain conjugated pentadienes; the the straight chain and branched chain conjugated hexadienes, and the like, are found suitable. In general, dienes containing more than 10 carbon atoms polymerize very slowly, if at all, in the present polymerization systems; consequently, it is preferred to employ a diene having ten carbon atoms or less. Dienes having from 4 to 6 carbon atoms have particularly advantageous reaction rates and polymerization characteristics and, therefore, are preferred. The butadiene-1,3 hydrocarbons, and butadiene-1,3, in particular, are preferred.

In accordance with this invention a monomer mixture to be polymerized may contain one or more copolymerizable non-carboxylic ethylenically unsaturated monomers in addition to or in place of the dienes. These monomers which are preferably monoolefinic monomers and which together with the aliphatic conjugated diene constitute a major portion of the monomeric mixture for preparing the preferred copolymers, may be any one of a number of monomers and preferably those copolymerizable with the dienes. Such monoolefinic monomers are well known in the art and are indicated by typical monomers set forth below. In particular, the monoolefinic monomer is characterized as one which contains an activated carbon-to-carbon double bond, that is, a monomer containing an olefinic double bond which readily functions in an addition polymerization reaction because of the olefinic double bond being present in the monomer molecule either in the alpha-beta position with respect to a stronger polar or functional group, such as nitrile, carboxylic ester, halogen, keto, amide, and other such groups well known in the art as activating groups, or because it is adjacent to a terminal methylene group, that is, $CH_2=C<$. Among the monoolefinic monomers copolymerizable with the carboxyl-containing monomers in aqueous dispersion and characterized by the presence of such groups are the aliphatic unsaturated nitriles, such as acrylonitrile, alpha-chloroacrylonitrile, methacrylonitrile, ethacrylonitrile; the alcohol esters of acrylic and substituted acrylic acids, such as methyl methacrylate, methyl acrylate, methyl ethacrylate, butyl methacrylate, isobutyl dichloro acrylate, and other acrylic esters of alcohols, preferably having one to six carbon atoms; styrenes, such as styrene itself, halo, cyano, alkyl, aryl, and other substituted styrenes, for example vinyl toluene, alpha methyl styrene, alpha chloro styrene, p-cyano styrene, p-phenyl styrene; other polymerizable vinyl compounds, such as vinyl naphthalene, vinyl pyridine, vinyl ethers and ketones; and other compounds such as vinylidene chloride.

When preparing carboxyl-containing diene copolymers, it is preferred to employ copolymerizable monolefinic monomers selected from the group consisting of nitriles, styrenes, and the alcohol esters of acrylic and alpha-substituted acrylic acids.

The amount of carboxyl-containing unsaturated monomers, aliphatic dienes and/or non-carboxylic ethylenically unsaturated monomers used to prepare the carboxylic latices of this invention may vary within very wide limits. In general, monomeric mixtures containing from about 20 percent to 90 percent by weight of a conjugated diene, and/or from about 10 percent to about 75 percent by weight of one or more of the non-carboxylic ehtylenically unsaturated monomers, with either one or the combined weight of these two monomeric materials usually constituting the major portion of the total monomeric mixture. The carboxyl-containing unsaturated monomer which is the essential part of the monomeric mixture constitutes a minor proportion of the monomeric charge and usually it may be present in amounts from as low as about 0.5% up to any minor proportion that is less than half of the total monomer charge.

Preferably the carboxyl-containing monomer constitutes from about 0.5% to 20% by weight of the monomer charge, and if it is a monocarboxylic acid, no more than 5% by weight of the monomer charge is often employed.

The carboxylic emulsifiers suitable for the purpose of this invention include fatty acids, rosin acids, selected mixtures and derivatives thereof. In general, these carboxylic emulsifiers contain from about 8 to about 40 carbon atoms per molecule, usually have one carboxylic acid group, and may be straight or branched chain aliphatic or alicyclic compounds with one or more ethylenically unsaturated carbon to carbon bonds. Exemplary of suitable fatty acids, rosin acids, or mixtures thereof are capric undecyclic, lauric, myristic, palmitic, stearic, oleic, linoleic, arachidic, hydrogenated abietic acid, dehydrogenated abietic or polymerized abietic acid, primaric, coconut, tall oil, and the like.

It will be appreciated that the term "carboxylic emulsifier" also includes in addition to the acids exemplified above, dimers, trimers and like condensation products of fatty or rosin acids (e.g., Empol, a $C_{36}$ dibasic acid made by dimerization of polyunsaturated fatty acids).

Suitable carboxylic acid derivatives include the fixed and volatile-base soaps. The fixed soaps are the alkali soaps prepared from the above described acids and such alkaline bases as the alkali metals and the higher boiling amines such as tripropylamine, the secondary and tertiary butyl, amyl, and hexylamines and the like which usually boil above 160° C. It will be appreciated that the expression "alkali soaps" refers to those soaps or salts prepared by reaction with an alkali metal, or amine. The volatile-base soaps are the soaps or salts of the above-described acids and volatile alkalis. Exemplary of the volatile-bases that may be used to form volatile soaps are ammonia and amines such as methylamine, ethylamine, dimethylamine, diethylamine, triethyl-amine, propylamine, dipropylamine, isopropylamine, diisopropylamine, butyl primary amines, amyl primary amines, hexyl primary amines, cyclohexylamine, piperidines, 1-methylpiperidine, 2-picoline, morpholine and the like, as well as mixed amines such as methyl ethylamine, methylpropylamine, methyl butylamine, methyl diethylamine and the like.

The alkali metal soaps of the fatty acids are effective emulsifiers, e.g., pottassium oleate, potassium stearate, potassium laurate, potassium myristate and the like, as are the alkali metal or ammonium soaps of the rosin acids, or modified rosin acids, such as the Dresinates. It will be appreciated that at the acid pH employed in the emulsion system of this invention, many of the fatty acids, rosin acids or mixtures thereof will be in the form of partial soaps or salts.

In accordance with this invention the amount of carboxylic emulsifier used in the aqueous emulsion system may be varied from about one to about 10 parts per hundred parts of monomer (phm.) charged to the system. Preferably, the level of carboxylic emulsifiers ranges from 2.5 to 3.5 phm.

Advantageously, small concentration of auxiliary emulsifiers or dispersants can be used with the carboxylic emulsifiers. Among the auxiliary emulsifiers or dispersants that can be used, are the anionic polymeric type dispersants such as the sodium salts of polymerized alkyl naphthalene sulfonic acid; e.g., Tamol SN, Davan 1, Daxad 11, Nycol and the like. The concentration of the auxiliary emulsifiers or dispersants is dependent on the nature and the amount of carboxylic emulsifiers present in the emulsion system as well as the monomeric mixture being polymerized and it can vary from about zero to 1.0 phm. For example, use of about 2.5 phm. of oleic acid and its salt as a primary emulsifier with 0.5 phm. of Tamol SN provides an effective acid emulsion polymerization system for producing a carboxylic latex from a mixture of 50 percent by weight of butadiene, 48 percent by weight of styrene and 2 percent by weight of itaconic acid; whereas use of 2.5 phm. of a rosin acid derivative such as Dresinate 731 in the emulsion polymerization of a mixture of 50 percent by weight of butadiene, 48 percent by weight of styrene, and 2 percent by weight of methacrylic acid is most effective when about 0.1 phm. of Tamol SN is employed as an auxiliary disperant.

As enumerated above, variations may be made in the monomeric charge, the nature and amounts of carboxylic emulsifiers and auxiliary emulsifiers. Advantageously, the pH of the emulsion polymerization system, which can be varied by the addition of alkaline materials or inorganic acids, provides a critical control or parameter for producing the unique carboxylic latices of the invention. Thus, although carboxylic latices can be produced by emulsion polymerization in aqueous system containing carboxylic emulsifiers and having a substantially neutral pH, the more preferred carboxylic latices, i.e., those containing a substantial proportion of bound acid, are produced in an acidic pH.

In particular, it has been found that the amount of bound acid, i.e., the number of carboxylic acid groups (COOH) within the polymer chain, in the carboxylic latex increases as the pH of the system decreases. In general the amount of bound acid in the carboxylic latex may vary from about 75% by weight of the carboxyl-containing monomer in the charge at a pH in the vicinity of 2.0 to about 10 to 20% of the charge at a pH of 6. Accordingly, because it is desired to have a substantial proportion of bound acid in the carboxylic latex, a pH of 6 or lower is preferred.

In addition to controlling the amount of bound acid, it has been found that the pH of the emulsion system also governs the rate of polymerization of certain monomeric mixtures. Specifically, our investigations show higher rates of polymerization usually occur in a pH range of from about 2.5 to 4.5, with the maximum rates often being at a pH of about 3.5 to 4.0 for the carboxyl-containing diene copolymer. In addition, it has also been found that the cations present in the polymerization system may in some cases affect the rate of polymerization in this pH range. For example, the rate of polymerization for a monomeric mixture containing 50% by weight of butadiene, 48% by weight of styrene and 2% of itaconic acid in an oleic acid system containing an auxiliary emulsifier and a potassium persulfate catalyst at a maximum is such that $K^+ > Na^+ > NH_4^+$. It will be understood that such cations are present in the emulsion system either as part of a carboxylic acid soap, a polymerization catalyst, or an alkaline addition used to regulate the pH of the system, i.e., sodium hydroxide, potassium hydroxide, and ammonium hydroxide.

It will be appreciated that optimum polymerization rates are dependent not only on the pH of the system but also on the monomer or monomeric mixtures being polymerized. Thus the optimum ranges specified above are representative of one system and not definitive for all others.

Another advantage of the emulsion polymerization system of this invention is that the rate of prefloc deposition or precoagulation of the polymeric solids from the latex can be lowered to a level which was heretofore obtainable only in highly alkaline polymerization systems. Since loss of the polymeric solids as prefloc greatly determines the commercial success of a polymerization system it will be realized that the amount of prefloc is a factor which must always be considered and if possible, kept to a minimum. Advantageously, it has been found that in most cases the amount of prefloc can be kept within acceptable levels by maintaining the emulsion system of this invention at a pH of 5 or below. It will be appreciated that in some instances the pH may be somewhat higher depending on the monomers, carboxylic emulsifiers and the like in the system.

The polymerization reaction usually is promoted by the addition of free radical yielding initiators such as the alkali persulfates, percarbonates, perborates, and the like; organic peroxides, such as benzoyl peroxide, acetyl peroxide and the like; alkyl peroxides such as di-t-butyl peroxide; and organic hydroperoxide such as di-isopropyl benzene hydroperoxide. Redox systems of initiation may be employed utilizing the above-mentioned substances with suitable reducing agents well known in the art. The monomeric reaction mixture may also contain small amounts of the sulfhydryl-group-containing compounds termed "modifiers" in the synthetic rubber industry such as alkyl mercaptans containing from about 10 to 22 carbon atoms, for example, n-dodecyl mercaptan, the commercially available mixed tertiary mercaptans containing from 12 to 16 carbon atoms, thiophenol, alpha- or beta-thionaphthol, and the like. The polymerization can be effected within a wide range of temperatures, for example, within the range of from about 0° to about 100° C. and preferably from about 60° to 80° C. Under such conversion conditions, it has been found that high conversions can be obtained and it is the usual practice to continue polymerization until conversions of 80% or more are reached. Conventional short-stopping agents such as hydroquinone, sodium sulfide, tetramethyl thiuram disulfide, or sodium dimethyl dithiocarbamate and the like may be added to the polymerization system to attain desired conversion levels.

The amount of water used in the polymerization system may be varied depending on the solids content desired in the resulting latices. In general, from about 120 to 200 parts of water per hundred parts of monomeric mixture are used to produce carboxylic latices having a solids content of from about 40 to 60% by weight.

The unique carboxylic latices of this invention can be characterized as stable aqueous dispersions of polymeric solids having a substantial proportion of bound acid in the polymer chain and having a particle size that may range from about 1500 A. to about 5500 A. As heretofore described, these latices are acidic in nature. Thus, in most instances these latices are treated with an alkaline material such as sodium hydroxide, ammonium hydroxide and the like to maintain their pH level sufficiently high during stripping so as to thereby prevent premature coagulation before the desired solids content is obtained. It will be appreciated that these latices can be readily coagulated by the addition of aqueous solutions of conventional coagulants such as sodium chloride, calcium chloride, calcium nitrate, zinc chloride and the like used alone or mixed with other coagulation aids.

The latices of this invention are suitable for many varied applications in the paper, paint coating, adhesive and plastic industries. For example, the carboxylic latices may be employed to improve the internal bond strength, the wet tensile strength, the elongation properties, the IGT pick, and the like of non-woven fibrous materials. Thus, the carboxylic latices may be employed to saturate paper after it has already been formed or it may be mixed with paper pulp to improve the properties of the paper produced therefrom.

In addition the preferred latices may be compounded with pigment, fillers and the like to produce latex paints or vulcanizable coatings, sheetings, films, foams and the like. Also they may be employed in other conventional applications of elastomeric latices such as preparation of rubber gloves, girdles, sheeting and the like.

It will also be realized that the latices, particularly the carboxylic latices, of this invention are compatible with other non-carboxylic latices of butadiene-styrene, butadiene-nitrile, acrylate-nitrile or the like with which the carboxylic latices may be blended to produce coatings, films, layers and the like having many desirable properties.

The following specific examples further illustrate this invention:

EXAMPLE I

An aqueous emulsion consisting of 165 parts of water, 3 parts of oleic acid, 0.5 part of Tamol SN, 0.04 part of ethylenediaminetetraacetic acid, 0.2 part of a potassium persulfate catalyst was loaded into a reactor together with 50 parts of butadiene, 48 parts of styrene, and 2 parts of itaconic acid. The pH of the emulsion was adjusted to 2 to 4 by the addition of an alkaline material. The reactor was raised to a temperature of about 65° C. and the contents agitated to provide a homogeneous emulsion. After about 21 hours, the polymerization had reached a conversion of about 90 percent; at which time, the agitation was stopped and the unreacted monomers and some of the water present were removed by vacuum stripping. As a result of this polymerization a carboxylic latex having a total solids content of about 50 to 55 percent, expressed in dry solids based on the total weight of the latex was produced. In addition during polymerization, stripping, or concentrating it was noted that very little floc, i.e., about 1 to 2 percent was formed. The pH during stripping was maintained at about 9 to 10.5 by the addition of ammonium hydroxide.

EXAMPLE II

Using the general procedure outlined in Example I several additional carboxylic latices were produced from a recipe containing 50 percent by weight butadiene, 48 percent by weight of styrene and 2 percent by weight of itaconic acid using various carboxylic emulsifiers at a pH of 7 or below. As noted in the following table, high conversions were obtained in each of these polymerizations and all emulsion systems were effective for producing carboxylic latices.

TABLE 1.—EFFECT OF CARBOXYLIC EMULSIFIERS ON POLYMERIZATION

| Carboxylic emulsifier | | Tamol SN (Parts) | pH | Percent conversion |
| --- | --- | --- | --- | --- |
| Kinds | Parts | | | |
| Stearic acid | 3 | 0.5 | 2.2 | 92.2 |
| Palmitic acid | 3 | 0.5 | 2.3 | 92.5 |
| Tall oil | 3 | 0.5 | 2.2 | 90.4 |
| Myristic acid | 3 | 0.5 | 2.2 | 90.2 |
| Lauric acid | 3 | 0.5 | 2.2 | 91.9 |
| Linoleic acid | 2.2 | 0.3 | 2.0 | 95.9 |
| Iso-stearic acid | 2.2 | 0.3 | 2.5 | 91.3 |
| Mixed fatty acids | 2.2 | 0.3 | 2.3 | 90.1 |
| Potassium oleate | 2.5 | 0.5 | 3.5 | 90.5 |
| Potassium stearate | 2.5 | 0.5 | 3.9 | 95.4 |
| Potassium laurate | 2.5 | 0.5 | 4.0 | 79.7 |
| Potassium myristate | 2.5 | 0.5 | 4.1 | 87.2 |
| Potassium salt of coconut oil | 2.5 | 0.5 | 3.9 | 85.3 |
| Potassium salt of tall oil | 2.5 | 0.5 | 4.0 | 92.5 |
| Potassium palmitate | 2.5 | 0.5 | 3.8 | 92.8 |
| Ammonium oleate | 2.5 | 0.5 | 4.0 | 95.9 |
| Morpholine oleate | 2.5 | 0.5 | 5.8 | 56.5 |

EXAMPLE III

In this example the effect of pH on the emulsion polymerization of a monomeric mixture containing 50 percent butadiene, 48 percent styrene and 2 percent itaconic acid in an oleic acid system is illustrated. A series of latices were prepared using 100 parts of the monomeric mixture in an emulsion system containing 150 parts of water, 2.2 parts of oleic acid, 0.5 part of Tamol SN, and 0.04 part of ethylenediaminetetraacetic acid. The polymerization reactions were conducted at a temperature of 65° C. at various pH levels; the pH being varied by the addition of potassium hydroxide. As shown in the following table, high rates of conversion are obtained over a pH range from about 2.5 to 4.5 with a maximum rate usually being from a range about 3.5 to 4. It will also be noted that the polymerization rate decreases to a minimum at a pH from about 6 to 6.5.

TABLE 2

Effect of pH on polymerization

| pH of system | Percent conversion per hour |
|---|---|
| 2.5 | 8.7 |
| 3.0 | 10.5 |
| 3.5 | 10.8 |
| 4.0 | 10.3 |
| 4.5 | 8.7 |
| 5.0 | 4.3 |
| 5.5 | 3.8 |
| 6.0 | 2.0 |
| 6.5 | 2.5 |
| 7.0 | 4.8 |

EXAMPLE IV

This example illustrates the effect of pH on the bound acid present in the carboxylic latices by using the latex recipe described in Example I and by successively adjusting the pH of the emulsion system in a series of polymerizations. In these polymerizations ammonium hydroxide was used to neutralize the pH of the system to different levels. The data in the following table show that as the pH of the polymerization increases the amount of bound acid, i.e. free carboxylic acid groups (COOH) within the latex substantially decreases.

TABLE 3

Effect of pH on the amount of bound acid in carboxylic latices

| pH of system | Parts of bound acid based on a charge containing 2 parts of an acid monomer |
|---|---|
| 2.5 | >1.3 |
| 3.0 | <1.1 |
| 3.5 | >0.9 |
| 4.0 | ~0.8 |
| 4.5 | <0.7 |
| 5.0 | >0.5 |
| 5.5 | >0.4 |
| 6.0 | >0.3 |
| 6.5 | ~0.3 |
| 7.0 | <0.3 |

EXAMPLE V

In this example carboxylic latices were produced in an aqueous system containing carboxylic emulsifiers without the use of auxiliary emulsifiers such as Tamol SN. Two polymerizations were conducted in which an aqueous emulsion containing a monomeric mixture of 50 percent by weight of butadiene, 48 percent by weight of styrene and 2 percent by weight of itaconic acid was charged into a reactor together with 2.2 parts of oleic acid as the sole emulsifier. The pH of the polymerization in the first run was 2.5 and in the second 3.0. In both polymerizations a final conversion of 96 percent was obtained after about 75.5 hours with less than 1 percent floc being present in the polymerization system. Examination of the carboxylic latices showed that the polymer prepared at a pH of 2.5 contained polymeric solids with a particle size of 4,500 A. and the latex prepared at a pH of 3.0, a particle size of 3,850 A.

Another latex was prepared using a monomeric mixture of 50 percent by weight of butadiene, 48 percent by weight of styrene, and 2 percent by weight of methacrylic acid. This polymerization was conducted at a pH of 4.2 in the presence of Dresinate 731 at a temperature from 60 to 65° C. for a period of about 78 hours to obtain 99 percent conversion with a 5 percent floc level.

EXAMPLE VI

Using the polymerization technique described in Example I several additional latices including carboxylic latices containing substantial amounts of bound acid were prepared from monomers containing alkaline sensitive groups (e.g., acrylic acid, methacrylic acid, maleic acid, mono-n-butyl itaconate, mono-n-butyl fumarate and methyl acrylate in aqueous system having a pH of 7 or below and containing different carboxylic emulsifiers. As shown in the following table high conversions of the latices are obtained in the emulsion polymerization system of this invention. The abbreviations used, to designate the monomers used, are as follows:

BD=butadiene
MA=methyl acrylate
EA=ethyl acrylate
MMA=methyl methacrylate
ST=styrene
AN=acrylonitrile
AA=acrylic acid
MAA=methacrylic acid
IA=itaconic acid
FA=fumaric acid
MBI=monobutyl itaconate
MMI=monomethyl itaconate
MBM=monobutyl maleate
MEHI=mono-2-ethyl hexyl itaconate
MEHM=mono-2-ethyl hexyl maleate TABLE 4.—LATICES PRODUCED WITH ALKALINE SENSITIVE GROUPS INCLUDING CARBOXYLIC LATICES PRODUCED WITH VARIOUS CARBOXYL-CONTAINING MONOMERIC MIXTURES

| Monomer content | Carboxylic emulsifier | | Auxiliary emulsifier | | pH | Percent conv. |
|---|---|---|---|---|---|---|
| | Kind | Amt. | Kind | Amt. | | |
| BD/ST/AA–50/48/2 | Oleic acid | 2.2 | Tamol SN | 0.5 | 2.9 | 94.6 |
| BD/ST/MAA–50/48/2 | do | 2.2 | do | 0.5 | 3.9 | 96.1 |
| BD/ST/MBM–75/20/5 | K-oleate | 2.0 | do | 0.5 | 4.6 | 94.4 |
| BD/ST/MEHM–75/18.9/6.1 | do | 2.0 | do | 0.5 | 5.0 | 97.8 |
| BD/ST/MBI–75/20/5 | do | 2.0 | do | 0.1 | 6.1 | 95.2 |
| BD/ST/MBI–75/20/5 | Dres 731 | 2.0 | do | 0.5 | 6.1 | 97.7 |
| BD/ST/MEHI–75/20/5 | Oleic acid | 2.2 | do | 0.5 | 2.9 | 97.1 |
| BD/AN/MAA–67/30/3 | do | 2.2 | do | 0.5 | 4.3 | 94.6 |
| BD/ST/MMI–75/20/5 | do | 2.0 | do | 0.25 | 3.4 | 91.3 |
| EA/MAA–99/1 | do | 2.5 | CO-880 | 1.0 | 2.5 | 100 |
| BD/AN/MMI–67/28/5 | do | 2.2 | Tamol SN | 0.25 | 4.1 | 96.4 |
| BD/IA–98/2 | do | 2.2 | do | 0.5 | 2.8 | 96.9 |
| ST/IA–98/2 | do | 2.2 | do | 0.5 | 2.7 | 96.1 |
| ST/AN/IA–75/23/2 | do | 2.2 | do | 0.5 | 3.1 | 80.5 |
| BD/ST/MBI–75/20/5 | Dres 731 | 2.0 | do | 0.5 | 6.1 | 97.7 |
| BD/ST/MBM–50/45/5 | do | 2.0 | do | 0.1 | 6.1 | 93.4 |
| BD/ST/MAA–50/48/2 | do | 2.5 | do | 0.1 | 6.1 | 93.5 |
| MA | Oleic acid | 2.5 | CO-880 | 1.0 | 2.8 | 100 |

EXAMPLE VIII

This example illustrates that the carboxylic latices produced by this invention provide films, coating, layers or the like which are substantially insensitive to water. Using the polymerization technique described in Example I several carboxylic latices were prepared from monomeric mixtures containing 50 or 75 percent by weight of butadiene, 20 or 45 percent by weight of styrene, and 5 percent by weight of a half ester of itaconic acid, i.e., monomethyl or monobutyl itaconate. In addition, a control latex was prepared by conventional emulsion polymerization using as emulsifier Sipex EST (trademark), a sodium salt of tridecyl ether sulfate, from a monomeric mixture containing 50 percent by weight of butadiene, 45.5 percent by weight of styrene and 4.5 percent by weight of monomethyl itaconate.

Each of the latices were used to saturate sheets of paper, i.e., creped, masking tape base substantially free of other polymeric materials.

Samples of each of these saturated papers were then evaluated for water sensitivity. The test procedure involved placing powdered indicator on one side of the saturated paper and then floating the other side on a surface of a pool of water. The time required for the water to penetrate or wet-through the paper as indicated by a change in the color of the indicator was noted and used as a measure of water sensitivity.

This test procedure is a modification of the Tappi test method designated as T433 m–44, in that the apparatus described therein is not used.

As a result of these tests, the papers saturated with the carboxylic latices of this invention showed no water penetration or wetting after more than one hour, but those saturated with the control latex showed immediate wetting; thus illustrating that the latices of this invention produce films which are substantially insensitive to water.

EXAMPLE VIII

Using several carboxylic latices produced by the polymerization technique described in Example I, tests were conducted to determine their ease of coagulation using conventional coagulation systems, i.e. alum, mineral acids or the like. In all cases the latices produced in accordance with this invention coagulated without difficulty or without the need for special procedures or special coagulation aids.

It will be understood that many other modifications may be made without departing from the spirit of the invention, and that the scope of the invention is not limited to the specification and specific examples set forth herein, but it is to be construed by the appended claims.

What is claimed is:

1. A polymerization system for producing unique polymeric latices containing alkaline sensitive groups which comprises an aqueous emulsion containing a carboxylic emulsifier selected from the group consisting of fatty acids, rosin acids, their partial soap derivatives and mixtures thereof, and polymerizable monomeric material containing alkaline sensitive groups selected from the class consisting of carboxyl groups and their ester derivatives at an acid pH; said emulsion containing from about 1 to about 10 parts of the emulsifier and from about 120 to about 200 parts of water, said parts being parts by weight per 100 parts by weight of the monomeric material.

2. The system of claim 1 in which said aqueous emulsion contains said carboxylic emulsifier as the primary emulsifier, and up to about 1.0 phm. of an anionic polymeric sulfonate as an auxiliary emulsifier.

3. The system of claim 1 in which said aqueous emulsion contains said carboxylic emulsifier as the primary emulsifier, and up to about 1.0 phm. of a nonionic auxiliary emulsifier.

4. A process for producing unique polymeric latices containing alkaline sensitive groups which comprises effecting polymerization of polymerizable monomeric material containing alkaline sensitive groups selected from the class consisting of carboxyl groups and their ester derivatives to a desired conversion at temperatures from about 0° to about 100° C. within an aqueous emulsion containing from about 1 to about 10 parts of a carboxylic emulsifier and from about 120 to 200 parts of water per 100 parts by weight of monomeric material and having an acid pH, said carboxylic emulsifier being selected from the group consisting of fatty acids, rosin acids, their partial soap derivatives and mixtures thereof.

5. The process of claim 4 in which said aqueous emulsion contains said carboxylic emulsifier as the primary emulsifier, and up to about 1.0 phm. of an anionic polymeric sulfonate as an auxiliary emulsifier.

6. A process for producing unique polymeric carboxylic latices having a substantial proportion of bound acid which comprises effecting polymerization of a monomeric mixture containing from about 0.5 to less than 50% by weight of at least one carboxylic-containing monomer selected from the group consisting of ethylenically unsaturated monocarboxylic and polycarboxylic acids and the partial esters of the polycarboxylic acids, from about 10 to about 75% by weight of at least one ethylenically unsaturated non-carboxylic monomer copolymerizable with a diene, and the balance consisting of at least one conjugated diene, to a desired conversion at temperatures from about 0° to about 100° C. within an aqueous emulsion containing from about 1 to about 10 parts of a carboxylic emulsifier and from about 120 to about 200 parts of water per 100 parts by weight of the monomeric mixture and having a pH in the range of from about 2 to about 6; said carboxylic emulsifier being selected from the group consisting of fatty acids, rosin acids, their partial soap derivatives and mixtures thereof.

7. The process of claim 6 in which said emulsion also contains up to about 1.0 phm. of an anionic polymeric sulfonate as an auxiliary emulsifier.

8. A unique polymeric latex containing alkaline sensitive groups which comprises a stable aqueous dispersion of polymeric solids prepared by polymerization of a polymerizable monomeric material containing alkaline sensitive groups selected from the group consisting of carboxyl groups and their ester derivatives at temperatures from about 0° to about 100° C. to a desired conversion within an aqueous emulsion containing from about 1 to about 10 parts of a carboxylic emulsifier and from about 120 to about 200 parts of water per 100 parts by weight of monomeric material and having an acid pH, said carboxylic emulsifier being selected from the group consisting of fatty acids, rosin acids, their partial soap derivatives and mixtures thereof.

9. The latex of claim 8 in which said aqueous emulsion contains said carboxylic emulsifier as the primary emulsifier, and up to about 1.0 phm. of an anionic polymeric sulfonate as an auxiliary emulsifier.

10. The system of claim 1 in which said unique latices are carboxylic latices having a substantial proportion of bound acid therein, said monomeric material comprises a polymerizable carboxylic-containing monomeric mixture, and said emulsion has a pH in the range of from about 2 to about 6.

11. The system of claim 10 in which said carboxylic containing monomeric mixture comprises at least one carboxyl-containing unsaturated monomer and at least one non-carboxylic copolymerizable monomer.

12. The system of claim 11 in which said carboxyl-containing monomer is selected from the group consisting of ethylenically unsaturated monocarboxylic and polycarboxylic acids and the partial esters of the polycarboxylic acids.

13. The system of claim 11 in which said non-carboxylic monomer is selected from the group consisting of aliphatic conjugated dienes, copolymerizable ethylenically unsaturated monomers and mixtures thereof.

14. The process of claim 4 in which said latices are unique carboxylic latices having a substantial proportion of bound acid therein, said polymerizable monomeric material comprises a carboxyl-containing monomeric mixture, and said aqueous emulsion has a pH in the range of from about 2 to about 6.

15. The latex of claim 8 in which said latex comprises a carboxylic latex capable of producing films and the like that are substantially insensitive to water penetration, and that have a substantial proportion of bound acid therein, said monomeric material comprising a carboxyl-containing monomeric mixture and said aqueous emulsion having a pH in the range of from about 2 to about 6.

16. The latex of claim 15 in which said carboxyl-containing monomeric mixture comprises at least one carboxyl-containing unsaturated monomer and at least one non-carboxylic copolymerizable monomer.

17. The latex of claim 15 in which said carboxyl-containing monomer is selected from the group consisting of ethylenically unsaturated monocarboxylic and polycarboxylic acids and the partial esters of the polycarboxylic acids.

18. The latex of claim 15 in which the non-carboxylic monomer is selected from the group consisting of aliphatic conjugated dienes, copolymerizable ethylenically unsaturated monomers and mixtures thereof.

19. The latex of claim 15 in which monomeric mixture contains from 0.5 to 20 percent by weight of at least one carboxyl-containing unsaturated monomer, 20 to 90 percent by weight of an aliphatic conjugated diene, and from 10 to 75 percent of non-carboxylic ethylenically unsaturated monomer copolymerizable with said diene.

References Cited

UNITED STATES PATENTS

| | | | |
|---|---|---|---|
| 2,604,668 | 7/1952 | Miller et al. | 18—57 |
| 2,610,964 | 9/1952 | Ewart et al. | 260—78.5 |
| 2,724,707 | 11/1955 | Brown | 260—80.7 |
| 2,763,635 | 9/1956 | Tucker et al. | 260—84.3 |
| 2,807,597 | 9/1957 | Sonnenfeld et al. | 260—29.7 |
| 2,880,189 | 3/1959 | Miller et al. | 260—29.7 |
| 2,897,167 | 7/1959 | Dreisbach et al. | 260—23 |
| 2,959,821 | 11/1960 | Kolb | 18—58.6 |
| 3,055,855 | 9/1962 | Anderson et al. | 260—29.7 |
| 3,085,076 | 4/1963 | Zimmerman | 260—29.7 |

DONALD E. CZAJA, Primary Examiner

R. A. WHITE, Assistant Examiner

U.S. Cl. X.R.

260—23, 27, 29.6, 29.7; 117—155, 161, 163